United States Patent
Jung et al.

(10) Patent No.: US 8,301,304 B2
(45) Date of Patent: Oct. 30, 2012

(54) DETECTING APPARATUS AND METHOD OF ROBOT CLEANER

(75) Inventors: Young-Gyu Jung, Seoul (KR); Sang-Cheon Kim, Seoul (KR); Tae-Woong Nah, Seoul (KR); Woo-Jin Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 993 days.

(21) Appl. No.: 12/331,837

(22) Filed: Dec. 10, 2008

(65) Prior Publication Data

US 2009/0157225 A1 Jun. 18, 2009

(30) Foreign Application Priority Data

Dec. 11, 2007 (KR) ........................ 10-2007-0128486

(51) Int. Cl.
*G05B 19/04* (2006.01)

(52) U.S. Cl. ........ 700/254; 700/245; 700/258; 700/259; 901/1; 901/46; 901/47

(58) Field of Classification Search .................. 700/245, 700/250, 254, 258, 259; 901/1, 46, 47; 356/3, 356/3.01, 3.02, 3.16, 123, 139.05–139.08, 356/399, 400; 250/201.1, 515.1; 359/221.2, 359/227, 233

See application file for complete search history.

(56) References Cited

U.S. PATENT DOCUMENTS

| | | | |
|---|---|---|---|
| 2005/0251292 A1* | 11/2005 | Casey et al. ................... | 700/245 |
| 2005/0267338 A1* | 12/2005 | Lipman ......................... | 600/300 |
| 2007/0016328 A1* | 1/2007 | Ziegler et al. ................. | 700/245 |
| 2007/0234492 A1* | 10/2007 | Svendsen et al. ............. | 15/21.1 |

FOREIGN PATENT DOCUMENTS

| | | |
|---|---|---|
| JP | 06-189877 A | 7/1994 |
| KR | 10-2003-0066010 A | 8/2003 |
| KR | 10-2005-0063537 A | 6/2005 |
| KR | 10-0585708 B1 | 5/2006 |
| WO | WO 2006026436 A2 * | 3/2006 |

* cited by examiner

*Primary Examiner* — Dalena Tran
*Assistant Examiner* — Spencer Patton
(74) *Attorney, Agent, or Firm* — Birch, Stewart, Kolasch & Birch, LLP

(57) ABSTRACT

A detecting apparatus and method of a robot cleaner is disclosed. The apparatus includes a detecting unit provided with a transmitting unit for sending a signal to detect the floor and a receiving unit for receiving a signal sent from the transmitting unit to be reflected on the floors an optic angle adjusting unit disposed at least one of the transmitting unit and the receiving unit and configured to adjust optic angles of the signals, and a light shielding unit configured to partially shield a signal sent through the optic angle adjusting unit in order to reduce a deviation of each signal of the transmitting unit and the receiving unit. Accordingly, a measurement deviation with respect to color and feel of the floor can be reduced. Also, an amount of light received at the receiving unit can be obtained as much as required, which allows an accurate detection of the detecting apparatus. In addition, even if there are both drop-off and bump on the floor, the robot cleaner can smoothly operate.

6 Claims, 7 Drawing Sheets

DETECTING APPARATUS AND METHOD OF ROBOT CLEANER

RELATED APPLICATION

The present disclosure relates to subject matter contained in priority Korean Application No. 10-2007-0128486, filed on Dec. 11, 2007, which is herein expressly incorporated by reference in its entirety.

BACKGROUND OF THE INVENTION

1. Field of the Invention

The present invention relates to a robot cleaner, and particularly, to a detecting apparatus and method of a robot cleaner, capable of reducing a measurement deviation with respect to color and texture of a floor, improving a detection accuracy by obtaining an amount of light received at a receiving unit as much as being required, and allowing a smooth operation of the robot cleaner even when there are drop-offs and bumps on the floor.

2. Background of the Invention

In the related art, a robot cleaner indicates an automatic cleaner which performs cleaning by itself while moving around on a floor, according to an input program, by using a charged battery as a power source.

Unlike an existing cleaning manner that a user moves a cleaner to clean a floor or the like, such robot cleaner allows an automatic cleaning due to an operation of a remote controller or a simple manipulation of operation buttons, thus saving time and trouble of cleaning taken by such cleaning.

The related art robot cleaner uses an infrared sensor and an optical lens installed at a lower surface thereof so as to detect a distance from a floor. The infrared sensor is provided with a transmitting unit and a receiving unit.

When light from the transmitting unit is reflected on a floor, a light tail is generated. The tail causes a measurement deviation at the receiving unit. In particular, the light tail may become longer according to detected color and feel of the floor, which causes a great measurement deviation at the receiving unit. As a result, it may be difficult to accurately measure distance from the floor.

In addition, in case where a drop-off exists on the floor, it is required to detect a relatively short distance for detecting such drop-off. In contrast, in case where a bump exists on the floor, it is required to detect a relatively long distance for detecting such bump. Hence, the robot cleaner according to the related art, which uses the on/off type infrared sensor having a constantly fixed measurement distance, cannot detect different distances, so that it cannot detect both the drop-off and the bump existing on the floor. Accordingly, due to the drop-off or bump not detected, errors may occur during the travel of the robot cleaner.

Furthermore, there may occur a case where a required amount of light is not received by the receiving unit due to color and texture of the floor. For example, in case of a black floor, the receiving unit may be able to receive a small amount of light, thereby making a smooth measurement difficult.

SUMMARY OF THE INVENTION

Therefore, in order to solve such problems, an object of the present invention is to provide a detecting apparatus of a robot cleaner capable of reducing a measurement deviation between a transmitting unit and a receiving unit.

Another object of the present invention is to provide a detecting apparatus of a robot cleaner capable of detecting both drop-offs and bumps.

Still another object of the present invention is to provide a detecting apparatus of a robot cleaner capable of ensuring a required amount of light when an amount of light received at a receiving side is not adequate.

To achieve these and other advantages and in accordance with one aspect of the present invention, as embodied and broadly described herein, there is provided a detecting apparatus of a robot cleaner, capable of detecting a floor on which the robot cleaner moves. The apparatus includes a detecting unit provided with a transmitting unit for sending a signal to detect the floor and a receiving unit for receiving a signal sent from the transmitting unit to be reflected on the floor. An optic angle adjusting unit is disposed at least one of the transmitting unit and the receiving unit and configured to adjust optic angles of the signals. A light shielding unit is configured to partially shield a signal sent through the optic angle adjusting unit in order to reduce a deviation of each signal of the transmitting unit and the receiving unit.

In another aspect of the present invention, a detecting sensor of a robot cleaner may include a first detecting sensor disposed at a rear side of the robot cleaner based upon an ongoing direction of the robot cleaner and at least one second detecting sensor disposed at a different position independent of the first detecting sensor. When a distance between the robot cleaner and the floor, detected by the first detecting sensor, is shorter than a certain distance, the robot cleaner is determined to be inclined.

In still another aspect of the present invention, a detecting sensor of a robot cleaner may further include a light amount adjusting unit configured to feedback an amount of light received at the receiving unit to adjust an amount of light sent from the transmitting unit.

In yet another aspect of the present invention, there is provided a detecting method of a robot cleaner, for detecting a floor on which the robot cleaner moves. The method including, a floor detecting step of sending a signal from a transmitting unit a signal for detecting the floor and receiving a signal at a receiving unit which is sent from the transmitting unit to be then reflected on the floor. An optic angle adjusting step of adjusting an optic angle by an optical angle adjusting unit of at least one of the sent signal and the received signal, and a light shielding step of partially shielding a signal sent through the optic angle adjusting unit so as to reduce a deviation of each of the sent signal and the received signal.

The light shielding step is configured to shield a part of a signal at a side where the sent signal and the received signal are not neighbored to each other.

The detecting method may further include a step of preventing a spread of at least one of the sent signal and the received signal, and inducing an ongoing direction thereof.

The floor detecting step may include a first detecting step of detecting the floor at a rear side of the robot cleaner based upon an ongoing direction of the robot cleaner, and a second detecting step of detecting the floor at least one position other than the rear side.

If the distance between the robot cleaner and the floor, detected at the first detecting step, is shorter than a certain distance, the robot cleaner is determined to be inclined.

In case where the distance between the robot cleaner and the floor, detected at the first detecting step, is constant, if a distance detected at the second detecting step between the robot cleaner and the floor is longer than a certain distance, it is determined that a drop-off exists in front of the robot cleaner.

The detecting method may further include a light amount adjusting step of feedbacking an amount of light of the received signal so as to adjust an amount of light of the sent signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of a detecting apparatus of robot cleaner according to the present invention, with reference to the accompanying drawings.

Figure 1:
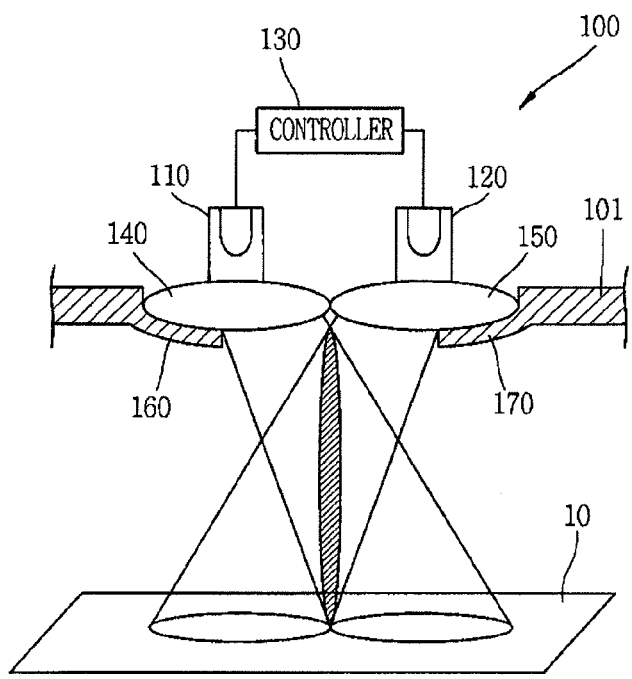
FIG. 1 is a schematic view showing a detecting apparatus of a robot cleaner in accordance with a first embodiment of the present invention.

FIG. 1 is a schematic view showing a detecting apparatus of a robot cleaner in accordance with a first embodiment of the present invention.

As shown in FIG. 1, a detecting apparatus 100 of a robot cleaner in accordance with a first embodiment of the present invention may include a detecting sensor having a transmitting unit 110 and a receiving unit 120, a controller 130, a transmitting side lens 140, a receiving side lens 150, a transmitting side light shielding unit 160, and a receiving side light shielding unit 170.

A reference numeral 10 denotes a floor on which the robot cleaner travels, and 101 denotes a casing of the robot cleaner.

The transmitting unit 110 is configured to transmit a signal for detecting the floor 10, and the receiving unit 120 is configured to receive a signal which is sent from the transmitting unit 110 and then reflected on the floor 10.

An infrared sensor for transmitting and receiving infrared rays may be used as the transmitting unit 110 and the receiving unit 120.

The controller 130 is configured to determine whether to drive the transmitting unit 110 and the receiving unit 120.

The transmitting side lens 140 and the receiving side lens 150 are provided at the transmitting unit 110 and the receiving unit 120, respectively, so as to adjust optic angles of light transmitted from the transmitting side 110 and light received at the receiving unit 120.

Thus, the transmitting side lens 140 and the receiving side lens 150 may be defined as an optic angle adjusting unit.

Here, it has been described to employ the transmitting side lens 140 and the receiving side lens 150; however, it is merely exemplary. An embodiment employing one of the transmitting side lens 140 and the receiving side lens 150 can be proposed.

Also, in the first embodiment, the lenses 140 and 150 are provided as the optic angle adjusting unit; however, the present invention is not limited to this configuration. That is, a reflector, such as a mirror, may be applied as the optic angle adjusting unit.

It is also available to move a lens barrel of the transmitting unit 110 and/or the receiving unit 120 so as to be functioned as the optic angle adjusting unit.

The transmitting side light shielding unit 160 and the receiving side light shielding unit 170 are configured to partially shield the transmitting side lens 140 and the receiving side lens 150, respectively. Such configured transmitting side light shielding unit 160 and receiving side light shielding unit 170 serve to partially shield light transmitted respectively through the transmitting side lens 140 and the receiving side lens 150.

Such light transmitted respectively through the transmitting side lens 140 and the receiving side lens 150 are characterized that an output is the highest at its central portion and becomes weaker toward its peripheral portion, whereby its tail becomes longer.

Also, such tail is lengthened when the floor 10, as a reflective face, has a relatively bright color and the floor 10 is even, whereas the tail is shortened when the floor 10 has a relatively dark color and the floor 10 is rough.

Upon detecting the floor 10, the transmitting side lens 140 and the receiving side lens 150 are partially shielded by the transmitting side light shielding unit 160 and the receiving side light shielding unit 170. Accordingly, a peripheral portion of light, which may generate such tail, transmitted through the transmitting side lens 140 and the receiving side lens 150, can be shielded. Hence, the tail can become relatively short on the floor 10, which allows a reduction of a measurement deviation with respect to color and texture of the floor 10, thereby enabling an accurate detection for the floor 10.

Here, the transmitting side light shielding unit 160 and the receiving side light shielding unit 170 may be disposed to shield the transmitting side lens 140 and the receiving side lens 150, respectively, from their outside to inside by certain lengths.

Also, the transmitting side light shielding unit 160 and the receiving side light shielding unit 170 may be integrally molded with the casing 101. Alternatively, they can be independently molded to be coupled to the casing 101.

Hereinafter, another embodiment of the present invention will be described. For the sake of explanation, the same portions to the first embodiment will be understood by the aforesaid description, which will thusly be omitted.

Figure 2:
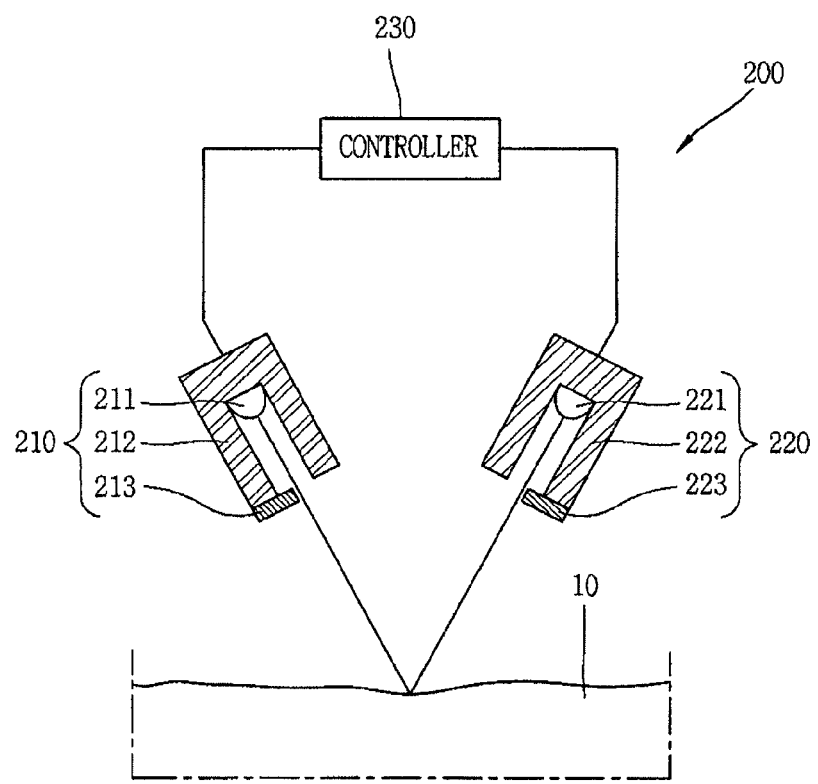
FIG. 2 is a schematic view showing a detecting apparatus of a robot cleaner in accordance with a second embodiment of the present invention.

FIG. 2 is a schematic view showing a detecting apparatus of a robot cleaner in accordance with a second embodiment of the present invention.

As shown in FIG. 2, a detecting apparatus 200 of a robot cleaner according to a second embodiment of the present invention may include a transmitting unit 210, a receiving unit 220 and a controller 230, thus to detect the floor 10.

The transmitting unit 210 is provided with a light transmitter 211, a transmitting side light inducing portion 212 and a transmitting side light shielding portion 213. The receiving unit 220 is provided with a light receiver 221, a receiving side light inducing portion 222 and a receiving side light shielding portion 223.

The light transmitter 211 outputs infrared light. Such infrared light emitted from the light transmitter 211 is induced toward the floor 10 by the transmitting side light inducing portion 212 formed with a certain length.

The light reflected on the floor 10 is then introduced into the receiving side light inducing portion 222 to be induced thereby. The induced reflected light reaches the light receiver 221, so as to be interpreted as information related to the floor 10. The interpreted information is then transferred to the controller 230.

In the second embodiment, the transmitting side light shielding portion 213 and the receiving side light shielding portion 223 are disposed at the transmitting side light inducing portion 212 and the receiving side light inducing portion 222, respectively.

Here, the transmitting side light shielding portion 213 and the receiving side light shielding portion 223 are molded separately from the transmitting side light inducing portion 212 and the receiving side light inducing portion 222, thereafter to be coupled to the transmitting side light inducing portion 212 and the receiving side light inducing portion 222, respectively.

With such configuration, infrared light outputted from the light transmitter 211 is induced by the transmitting side light inducing portion 212. Such induced light reaches the floor 10 with being partially shielded by the transmitting side light shielding portion 213. Such light reached on the floor 10 is then reflected to be induced by the receiving side light inducing portion 222 with being partially shielded by the receiving side light shielding portion 223, thereby being transferred to the light receiver 221.

The transferred light can smoothly reach the floor 10 to then be reflected. A portion at which a tail may be generated can also be reduced. Thus, the detection accuracy of the detecting apparatus 200 can be improved.

Figure 3:
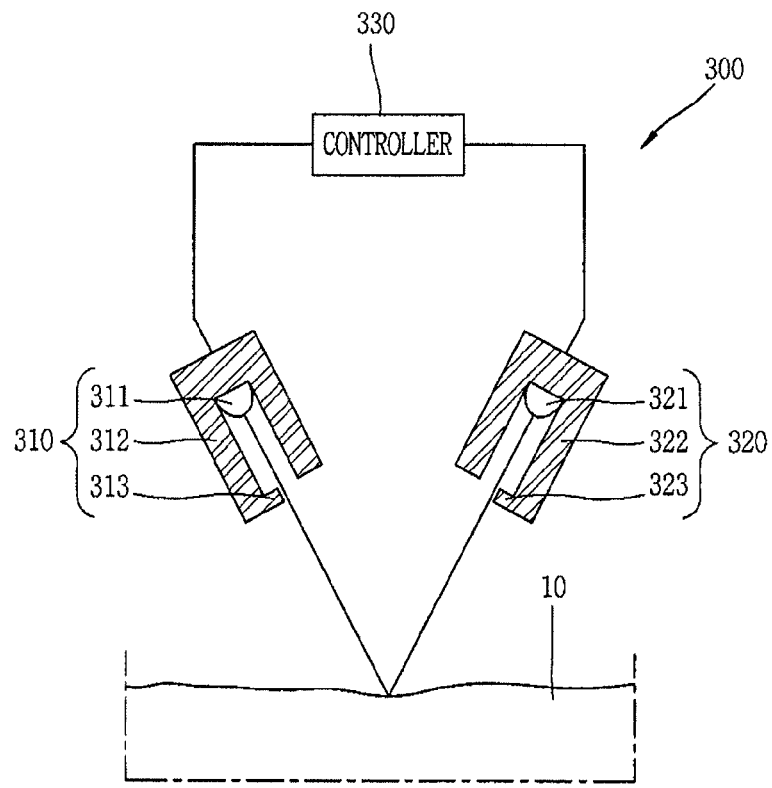
FIG. 3 is a schematic view showing a detecting apparatus of a robot cleaner in accordance with a third embodiment of the present invention.

FIG. 3 is a schematic view showing a detecting apparatus of a robot cleaner in accordance with a third embodiment of the present invention.

As shown in FIG. 3, a detecting apparatus 300 of a robot cleaner according to a third embodiment may include a transmitting unit 310 provided with a light transmitter 311, a transmitting side light inducing portion 312 and a transmitting side light shielding portion 313. A receiving side 320 is provided with a light receiver 321, a receiving side light inducing portion 322 and a receiving side light shielding portion 323, and a controller 330.

The detecting apparatus 300 having such configuration detects the floor 10, as a detection target, which faces a bottom of the robot cleaner.

In the third embodiment, the transmitting side light shielding portion 313 and the receiving side light shielding portion 323 are integrally formed with the transmitting side light inducing portion 312 and the receiving side light inducing portion 322, respectively.

With such configuration, the transmitting unit 310 and the receiving unit 320 can be easily fabricated, which allows a reduction of a fabricating cost.

Figure 4:
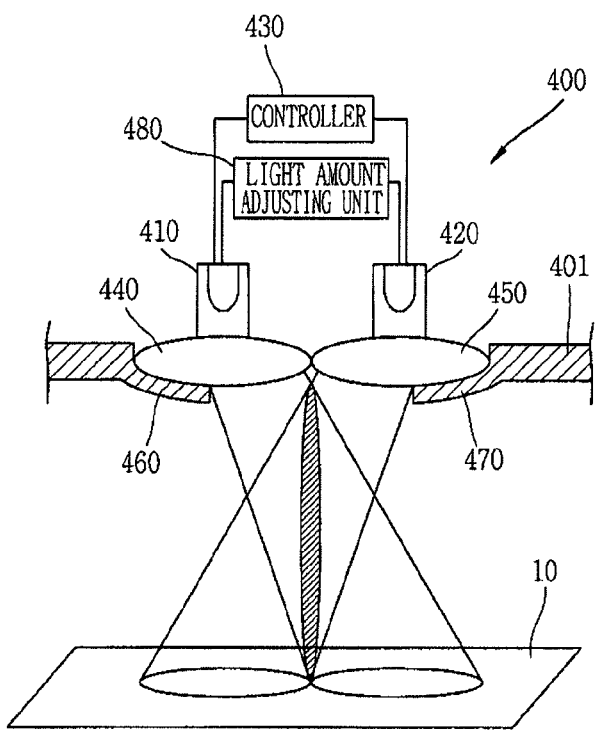
FIG. 4 is a schematic view showing a detecting apparatus of a robot cleaner in accordance with a fourth embodiment of the present invention.

FIG. 4 is a schematic view showing a detecting apparatus of a robot cleaner in accordance with a fourth embodiment of the present invention.

As shown in FIG. 4, a detecting apparatus 400 of a robot cleaner according to a fourth embodiment of the present invention may include a transmitting unit 410 and a receiving unit 420 both configuring a detecting sensor, a controller 430, a transmitting side lens 440, a receiving side lens 450, a transmitting side light shielding portion 460, and a receiving side light shielding portion 470.

In the fourth embodiment, the detecting apparatus 400 may further include a light amount adjusting unit 480.

The light amount adjusting unit 480 feedbacks an amount of light received at the receiving unit 420, thus to adjust the amount of light outputted from the transmitting unit 410. That is, the amount of light received at the receiving unit 420 can be varied according to color and texture of the floor 10. If an amount of light received at the receiving unit 420 is not as much as being required, the light amount adjusting unit 480 sends a signal to the transmitting unit 410 so as to make it output a relatively greater amount of light. Accordingly, the amount of light received at the receiving unit 420 can be obtained up to a required level, resulting in an accurate detection of the detecting apparatus 400.

Here, the light amount adjusting unit 480 is provided as a component separate from the controller 430, which is merely exemplary. Without separately employing the light amount adjusting unit 480, an embodiment can be proposed that the controller 430 can perform the function of the light amount adjusting unit 480.

Figure 5:
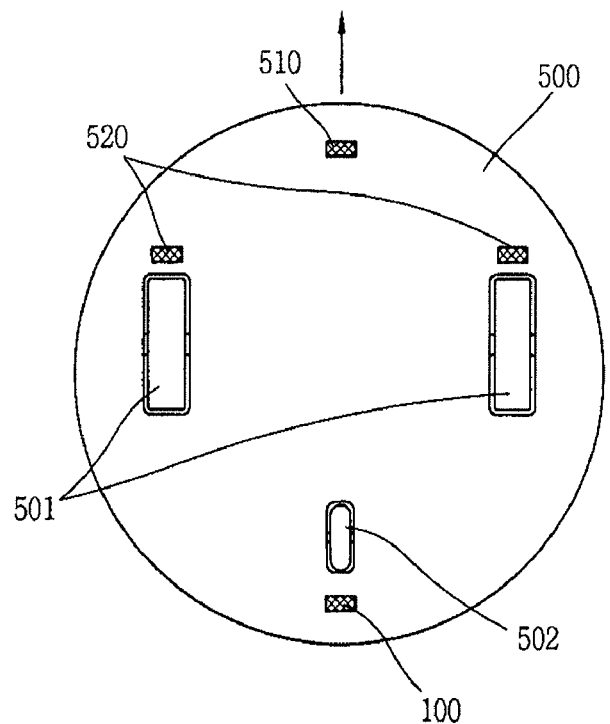
FIG. 5 is a schematic view showing a bottom of a robot cleaner employing a detecting apparatus in accordance with a fifth embodiment of the present invention.
Figure 6:
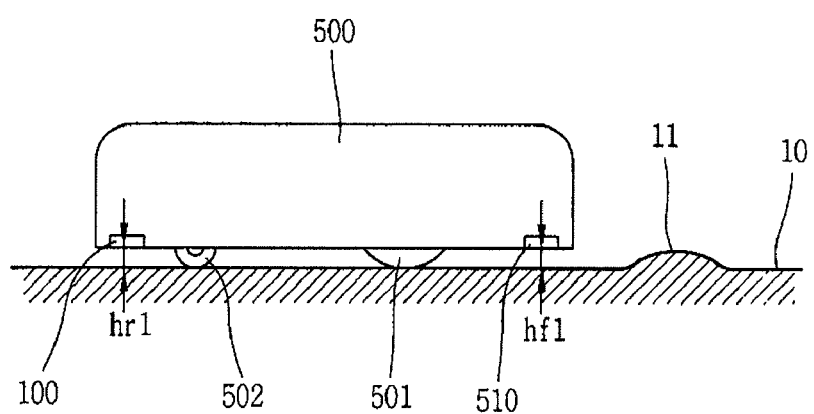
FIG. 6 is a schematic view showing a state before the robot cleaner employing the detecting apparatus according to the fifth embodiment climbs over a bump.
Figure 7:
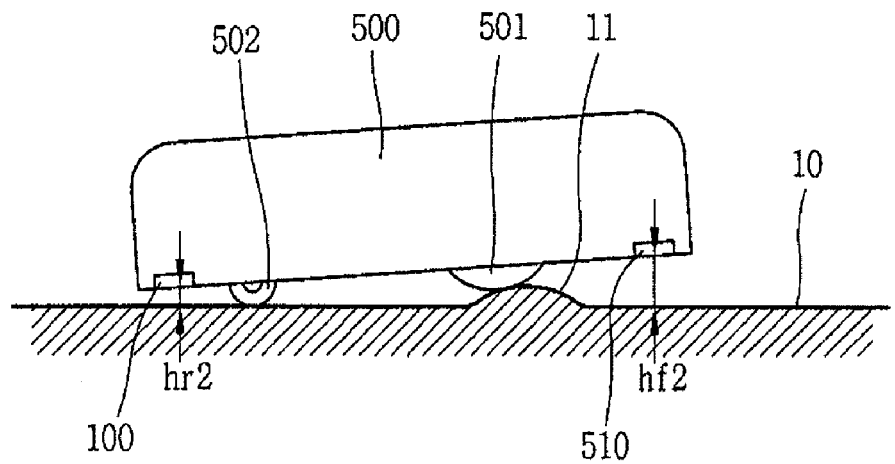
FIG. 7 is a view showing a state at the moment when the robot cleaner of FIG. 6 climbs over the bump.
Figure 8:
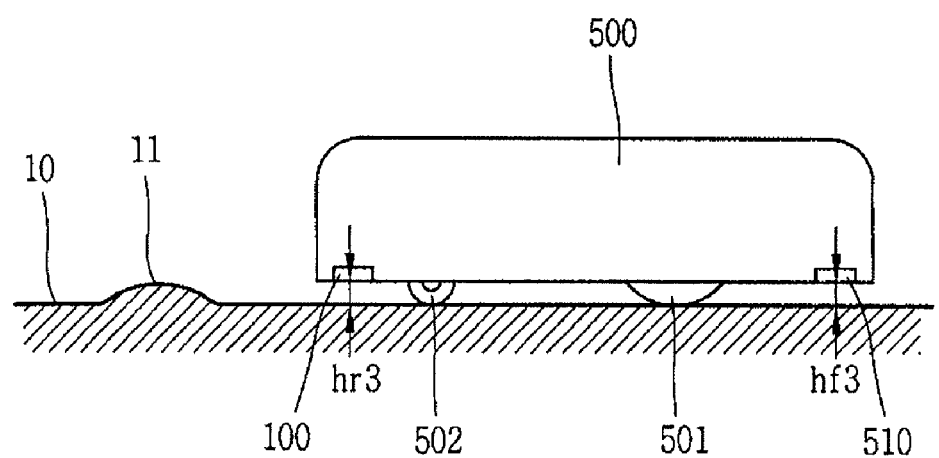
FIG. 8 is a view showing a state after the robot cleaner of FIG. 7 climbs over the bump.
Figure 9:
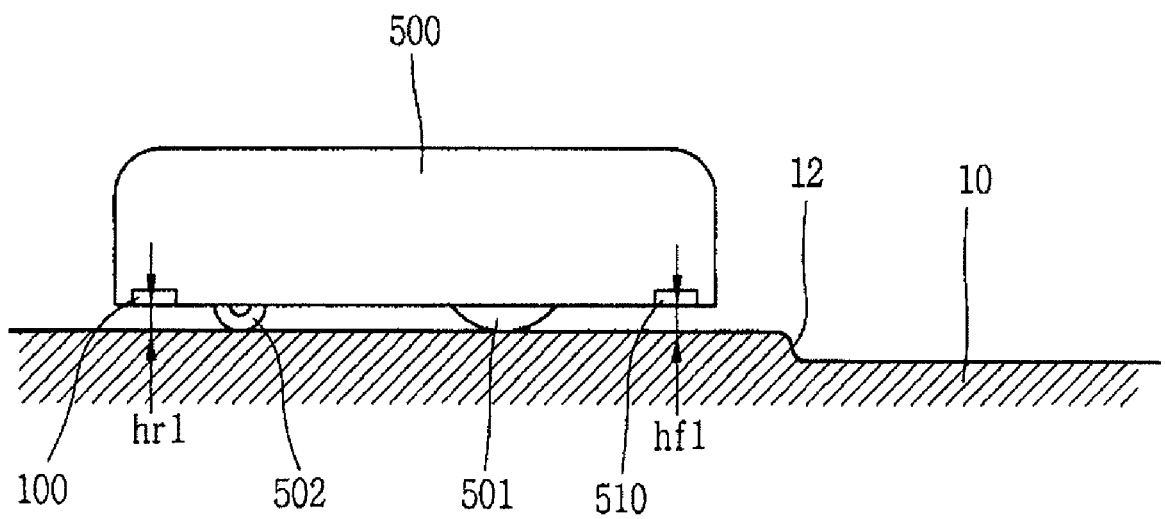
FIG. 9 is a view showing a state that the robot cleaner employing the detecting apparatus according to the fifth embodiment is confronted with a drop-off.

FIG. 5 is a schematic view showing a bottom of a robot cleaner employing a detecting apparatus in accordance with a fifth embodiment of the present invention, FIG. 6 is a schematic view showing a state before the robot cleaner employing the detecting apparatus according to the fifth embodiment climbs over a bump, FIG. 7 is a view showing a state at the moment when the robot cleaner of FIG. 6 climbs over the bump, FIG. 8 is a view showing a state after the robot cleaner of FIG. 7 climbs over the bump, and FIG. 9 is a view showing a state that the robot cleaner employing the detecting apparatus according to the fifth embodiment is confronted with a drop-off.

As shown in FIGS. 5 to 9, a robot cleaner 500 employing a detecting apparatus according to a fifth embodiment of the present invention may include driving rollers 501 and a caster as a sub roller 502.

On the basis of an ongoing direction of the robot cleaner 500, a front side sensor 510 is disposed at a front side of a bottom of the robot cleaner 500, and driving roller side sensors 520 are disposed at a front side of driving rollers 501. A rear side sensor 530 is disposed near the caster 502.

The front side sensor 510 and the driving roller side sensors 520 may be configured as a typical infrared sensor, and the rear side sensor 530 can be configured as a sensor in accordance with one of the first to fourth embodiments having described above. Also, the rear side sensor 530 may be configured as a tilting sensor capable of detecting an inclination of the robot cleaner 500.

While the robot cleaner 500 having such configuration travels, if a distance between the bottom of the robot cleaner 500 and the floor 10 is detected by the rear side sensor 530 to be closer than a certain distance, a controller can determine that the robot cleaner 500 is inclined.

The robot cleaner 500 can be inclined when it crosses a drop-off or bump. In this case, the malfunction of the robot cleaner 500 can be prevented in a manner of ignoring detection values of the front side sensor 510 and the driving roller side sensors 520, other than the rear side sensor 530.

In addition, the robot cleaner 500 can detect the drop-off as well as the bump. Accordingly, even in case where the drop-off and the bump all exist on the floor 10, the robot cleaner 500 can smoothly operate.

Hereinafter, the case where the robot cleaner 500 goes over such drop-off and bump will be described with reference to FIGS. 6 to 9.

First, FIG. 6 shows that the robot cleaner 500 is close to a bump 11 existing on the floor 10 during its traveling. The front side sensor 510 maintains a distance hf1 and the rear side sensor 530 maintains a distance hr1, with respect to the floor 10.

When the robot cleaner 500 reaches the bump 11 to go over the bump 11, as shown in FIG. 7, the robot cleaner 500 is inclined such that its front side is raised up and its rear side is lowered. At this moment, the front side sensor 510 is spaced apart from the floor 10 by a distance hf2, and the rear side sensor 530 is spaced apart therefrom by a distance hr2. Here, hf2 corresponds to a relatively remoter distance than hf1 and hr2 corresponds to a relatively shorter distance than hr1. Upon the occurrence of the distance difference, it can be determined that the robot cleaner 500 is inclined. When being determined that the robot cleaner 500 is inclined, the detection values of the front side sensor 510 and the driving roller side sensors 520 can be ignored.

If the robot cleaner 500 travels again on the even floor 10 after going over the bump 11, the front side sensor 510 maintains a distance hf3 and the rear side sensor 530 maintains a distance hr3, with respect to the floor 10. Here, hf3 and hr3 may substantially be equal to hf1 and hr1, respectively. In this case, the detection values of the front side sensor 510 and the driving roller side sensors 520 can be reflected during the controlling process of the controller.

As shown in FIG. 9, on the other hand, when the robot cleaner 500 travels close to a drop-off 12 existing on the floor 10, the drop-off 12 can be detected in a manner of recognizing the changes in the detection values of the front side sensor 510, the driving roller side sensors 520 and the rear side sensor 530.

As such, the robot cleaner 500 having the detecting apparatus according to the embodiment of the present invention can detect both the drop-off and the bump. Therefore, even if there are the bump as well as the drop-off on the floor 10, the robot cleaner 500 can smoothly operate.

Figure 10:
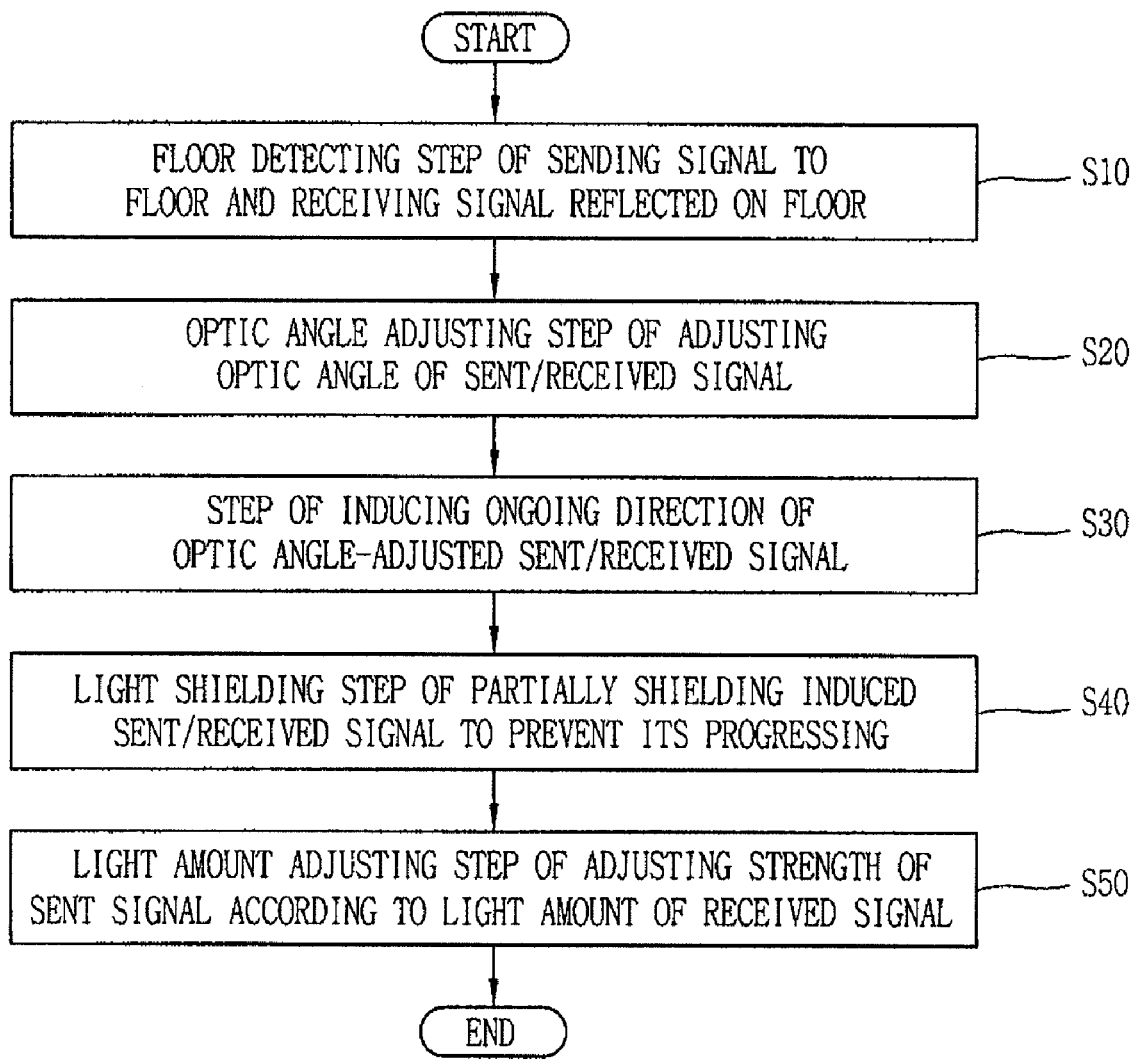
FIG. 10 is a flowchart showing that a robot cleaner detects a state of a floor in accordance with one embodiment of the present invention.
Figure 11:
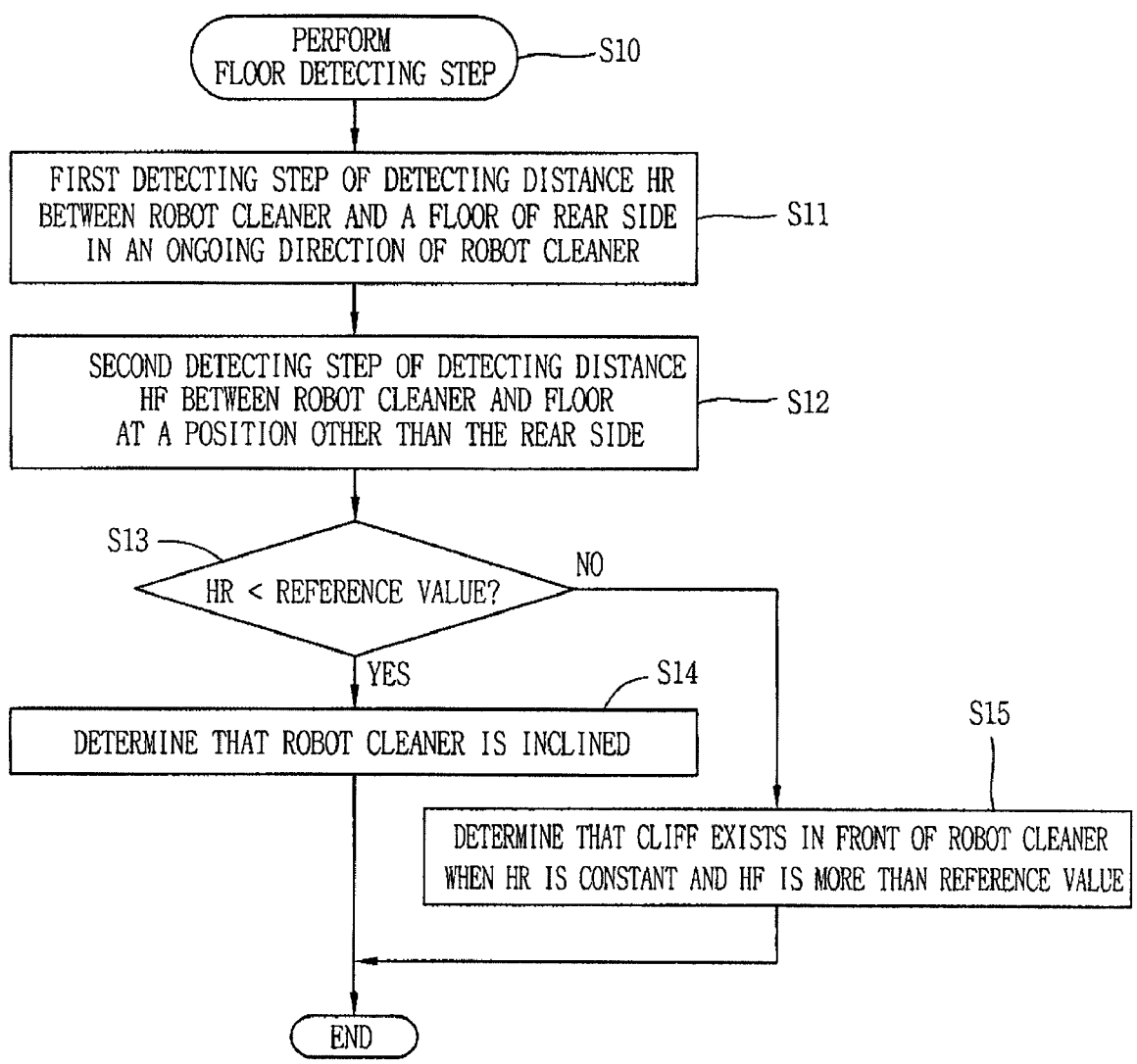
FIG. 11 is a detailed flowchart of a floor detecting step of FIG. 10.

FIG. 10 is a flowchart showing that a robot cleaner detects a state of a floor in accordance with one embodiment of the present invention, and FIG. 11 is a detailed flowchart of a floor detecting step of FIG. 10.

A detecting method of a robot cleaner according to one embodiment will be described with reference to FIGS. 10 and 11.

A detecting method of a robot cleaner according to one embodiment, in which a floor on which the robot cleaner moves is detected, may include a floor detecting step (S10) of sending a signal for detecting the floor from a transmitting unit and receiving unit the signal which is transmitted to be then reflected on the floor at an optic angle adjusting unit, an optic angle adjusting step (S20) of adjusting by an optic angle adjusting unit an optic angle of at least one of the sent signal and the received signal, and a light shielding step (S40) of partially shielding light transmitted through the optic angle adjusting unit so as to reduce a deviation between the sent signal and the received signal.

Here, the detecting method of the robot cleaner may further include a step of preventing a spread of one of the transmitted signal and the received signal and inducing an ongoing direction thereof (S30), and feedbacking an amount of light of the received signal to adjust the amount of light of the sent signal (S50).

The light shielding step S40 is configured to partially shield a signal at a side where the sent signal and the received signal are not neighbored to each other. Accordingly, the transmitting unit and the receiving unit respectively sending and receiving such signals can remove tails of the transmitted/received signals which are generated at the edge where they are not adjacent to each other, resulting in a more accurate detection of the floor.

The floor detecting step S10 includes a first detecting step (S11) of detecting the floor at a rear side of the robot cleaner based upon the ongoing direction of the robot cleaner, and a second detecting step (S12) of detecting the floor at least one different position other than the rear side. When a distance detected at the first detecting step between the robot cleaner and the floor is shorter than a certain distance, it is determined that the robot cleaner is inclined (S13 and S14).

If the distance detected at the first detecting step between the robot cleaner and the floor is constant and a distance detected at the second detecting step between the robot cleaner and the floor is longer than a certain distance, it is determined that a drop-off is formed at a front side of the robot cleaner (S13 and S15).

With a detecting apparatus of a robot cleaner according to one aspect of the present invention, upon detecting a floor, a transmitting side light shielding portion and a receiving side light shielding portion can shield peripheral portions of light, which may generate tails after being transmitted through a transmitting side lens and a receiving side lens. Hence, since the tail can relatively be shorter at a reflective face, a measurement deviation with respect to color and feel of the floor can be reduced, thereby enabling an accurate detection for the floor.

Also, a detecting apparatus of a robot cleaner according to another aspect of the present invention is provided with a light amount adjusting unit so as to feedback an amount of light received at a receiving unit and an amount of light outputted from a transmitting unit. That is, the amount of light received at the receiving unit can be varied according to the color and feel of the floor. When the amount of light received at the receiving unit is not as much as being required, the light amount adjusting unit transfers a signal to the transmitting unit to make it output a relatively greater amount of light. Therefore, the amount of light received at the receiving unit can be obtained as much as being required, which allows an accurate detection of the detecting apparatus.

In addition, a detecting apparatus of a robot cleaner according to still another aspect of the present invention includes a first detecting sensor disposed at a rear side of the robot cleaner based upon an ongoing direction of the robot cleaner, and at least one second detecting sensor disposed at a different position from the first detecting sensor. Accordingly, when a distance between the robot cleaner and the floor detected by the first detecting sensor is shorter than a certain distance, it can be determined that the robot cleaner is inclined, which allows a detection of drop-offs as well as bumps. Therefore, even if there are both the drop-off and the bump on the floor, the robot cleaner can smoothly operate.

The present invention has been explained with reference to the embodiments which are merely exemplary. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

What is claimed is:

1. A robot cleaner, comprising:
a detecting apparatus capable of detecting a floor on which the robot cleaner moves, the detecting apparatus comprising:
a detecting unit provided with a transmitting unit for sending a signal to detect the floor and a receiving unit for receiving the signal sent from the transmitting unit;
an optic angle adjusting unit disposed at at least one of the transmitting unit and the receiving unit and configured to form optic angles of the signals;
a light shielding unit configured to partially shield a signal sent through the optic angle adjusting unit by shielding a peripheral portion of the signal in order to reduce a measurement deviation between the transmitting unit and the receiving unit; and
a light amount adjusting unit configured to feedback an amount of light received at the receiving unit to adjust an amount of light sent from the transmitting unit,
wherein the light shielding unit is configured to partially shield the optic angle adjusting unit, and shield the optic angle adjusting unit by a certain length from an outer side of the optic angle adjusting unit to an inner side thereof.

2. The robot cleaner of claim 1, wherein the detecting unit includes a first detecting sensor disposed at a rear side of the robot cleaner based upon an ongoing direction of the robot cleaner and at least one second detecting sensor disposed at a position different than the position of the first detecting sensor, wherein when a distance between the robot cleaner and the floor, detected by the first detecting sensor, is shorter than a certain distance, the robot cleaner is determined to be inclined.

3. A method for detecting a floor on which a robot cleaner moves, the method comprising:
a floor detecting step comprising sending a signal from a transmitting unit for detecting the floor and receiving the signal reflected from the floor at a receiving unit;
an optic angle adjusting step comprising forming an optical angle of at least one of the sent signal and the received signal by an optical angle adjusting unit;
a light shielding step comprising partially shielding a signal sent through the optic angle adjusting unit by shielding a peripheral portion of the signal in order to reduce a measurement deviation between the transmitting unit and the receiving unit; and
a light amount adjusting step comprising feeding back an amount of light of the received signal so as to adjust an amount of light of the sent signal,
wherein the light shielding step shields a part of the signal at a side where the sent signal and the received signal are not neighbored to each other.

4. The method of claim 3, wherein the floor detecting step further comprises:
a first detecting step of detecting the floor at a rear side of the robot cleaner based upon an ongoing direction of the robot cleaner; and
a second detecting step of detecting the floor at at least one position other than the rear side.

5. The method of claim 4, wherein if the distance between the robot cleaner and the floor, detected at the first detecting step, is shorter than a certain distance, the robot cleaner is determined to be inclined.

6. The method of claim 4, wherein if the distance detected at the first detecting step between the robot cleaner and the floor is constant, and a distance detected at the second detecting step between the robot cleaner and the floor is longer than a certain distance, it is determined that a drop-off exists in front of the robot cleaner.

* * * * *